United States Patent
Hasejima et al.

(10) Patent No.: US 10,836,432 B2
(45) Date of Patent: Nov. 17, 2020

(54) PARKING ASSIST APPARATUS

(71) Applicant: Clarion Co., Ltd., Saitama (JP)

(72) Inventors: Noriyasu Hasejima, Tokyo (JP); Shinya Tagawa, Saitama (JP); Takehito Ogata, Tokyo (JP)

(73) Assignee: CLARION CO., LTD., Saitama (JP)

( * ) Notice: Subject to any disclaimer, the term of this patent is extended or adjusted under 35 U.S.C. 154(b) by 187 days.

(21) Appl. No.: 16/314,594

(22) PCT Filed: Jun. 5, 2017

(86) PCT No.: PCT/JP2017/020776
§ 371 (c)(1),
(2) Date: Dec. 31, 2018

(87) PCT Pub. No.: WO2018/003411
PCT Pub. Date: Jan. 4, 2018

(65) Prior Publication Data
US 2019/0322318 A1    Oct. 24, 2019

(30) Foreign Application Priority Data
Jul. 1, 2016  (JP) .................................. 2016-132088

(51) Int. Cl.
*B60W 30/06* (2006.01)
*B60W 50/12* (2012.01)
(Continued)

(52) U.S. Cl.
CPC ........... *B62D 15/028* (2013.01); *B60W 30/06* (2013.01); *B60W 50/12* (2013.01); *G06K 9/00812* (2013.01)

(58) Field of Classification Search
CPC ....... B60R 21/00; B60W 30/06; B60W 50/12; B62D 15/027; B62D 15/028; G06K 9/00812; G08G 1/16

See application file for complete search history.

(56) References Cited

U.S. PATENT DOCUMENTS 6,985,171 B1 * 1/2006 Kuriya ...................... B60R 1/00
                                                        340/435
7,295,227 B1 * 11/2007 Asahi .................. B62D 15/0275
                                                        348/118
(Continued)

FOREIGN PATENT DOCUMENTS

EP    1862376 A2    12/2007
EP    2246231 A1 *  11/2010  ............ B60W 30/06
(Continued)

OTHER PUBLICATIONS

Extended European Search Report issued in corresponding European Patent Application No. 17819776 dated Jan. 22, 2020.
(Continued)

*Primary Examiner* — Tyler J Lee
(74) *Attorney, Agent, or Firm* — Foley & Lardner LLP

(57) ABSTRACT

A parking assist apparatus 1 of the present invention assists parallel parking of an own vehicle 21. The parking assist apparatus 1 includes: a first route calculation unit 11 configured to calculate a first route for moving the own vehicle 21 from a target parking position P1 to a virtual departure position P3 based on a parking space and a constraint condition of own vehicle behavior; a second route calculation unit 12 configured to calculate a second route for moving the own vehicle 21 from an initial position P0 where parking assistance is started to the virtual departure position P3; and a parking route setting unit 13 configured to set a parking route of the own vehicle 21 with use of the first route and the second route.

4 Claims, 17 Drawing Sheets

(51) Int. Cl.
*B62D 15/02* (2006.01)
*G06K 9/00* (2006.01)

(56) References Cited

U.S. PATENT DOCUMENTS

| | | | |
|---|---|---|---|
| 9,540,001 B2* | 1/2017 | Inagaki | B62D 15/0285 |
| 2002/0128750 A1* | 9/2002 | Kakinami | B60R 1/00 |
| | | | 701/1 |
| 2005/0021203 A1 | 1/2005 | Iwazaki et al. | |
| 2009/0123028 A1* | 5/2009 | Satonaka | G01S 13/931 |
| | | | 382/103 |
| 2010/0019934 A1* | 1/2010 | Takano | B62D 15/028 |
| | | | 340/932.2 |
| 2011/0102196 A1* | 5/2011 | Kadowaki | B62D 15/0275 |
| | | | 340/932.2 |
| 2011/0144865 A1* | 6/2011 | Niemz | B62D 5/0469 |
| | | | 701/42 |
| 2013/0096816 A1* | 4/2013 | Takano | B62D 15/0275 |
| | | | 701/400 |
| 2013/0173148 A1* | 7/2013 | Kagawa | B62D 15/028 |
| | | | 701/400 |
| 2015/0100193 A1 | 4/2015 | Inagaki et al. | |
| 2015/0291030 A1* | 10/2015 | Oiki | B60K 28/00 |
| | | | 701/70 |
| 2015/0321555 A1* | 11/2015 | Fukata | B60K 28/10 |
| | | | 701/70 |
| 2016/0107691 A1* | 4/2016 | Goldmann | B62D 15/0285 |
| | | | 701/41 |
| 2017/0129486 A1* | 5/2017 | Nakada | B60W 10/20 |
| 2017/0158240 A1* | 6/2017 | Joos | B62D 15/0285 |
| 2018/0370566 A1* | 12/2018 | Kojo | G06K 9/00812 |

FOREIGN PATENT DOCUMENTS

| | | |
|---|---|---|
| JP | 2005-014775 A | 1/2005 |
| JP | 2010-208392 A | 9/2010 |
| JP | 2011-178272 A | 9/2011 |
| JP | 2015-003565 A | 1/2015 |
| JP | 2015-74253 A | 4/2015 |

OTHER PUBLICATIONS

International Search Report with English translation and Written Opinion issued in corresponding application No. PCT/JP2017/020776 dated Aug. 22, 2017.

* cited by examiner

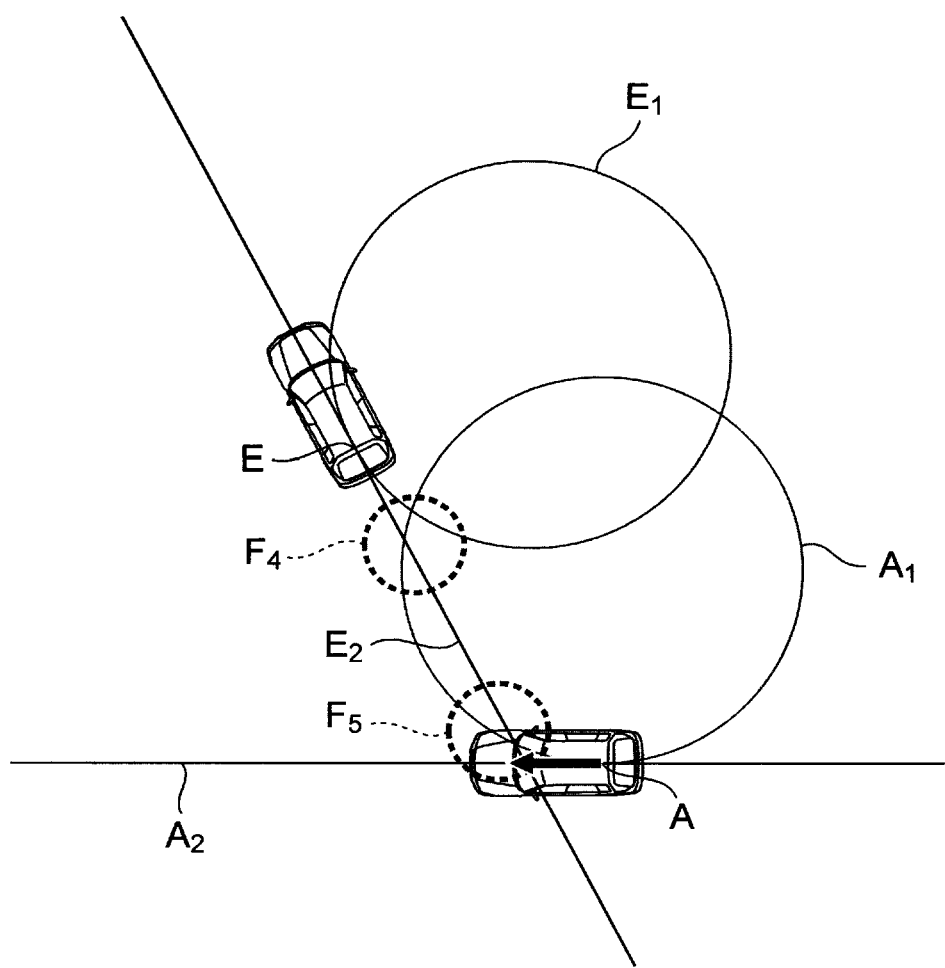

$m(X_m, Y_m) = ((X_e + R\sin\theta)/2, (Y_e - R\cos\theta + R)/2)$ $m(X_m, Y_m) = ((X_e - R\sin\theta)/2, (Y_e + R\cos\theta - R)/2)$

PARKING ASSIST APPARATUS

TECHNICAL FIELD

The present invention relates to a parking assist apparatus that assists parallel parking of an own vehicle.

BACKGROUND ART

PTL 1 discloses a technique of a parking assist apparatus that calculates a guide route including turning back for parking a vehicle and assists the vehicle to reach a target position along the guide route.

CITATION LIST

Patent Literature

PTL 1: JP2010-208392 A

SUMMARY OF INVENTION

Technical Problem

In the technique disclosed in PTL 1, the guide route is calculated based on a positional relationship and a relationship of a vehicle orientation between an initial position where the parking assistance is started and a target parking position. Therefore, parking assistance cannot be performed, for example, when the initial position of the vehicle is in a place from which guidance to the target parking position cannot be performed.

The present invention has been made in view of the above point, and it is an object of the invention to provide a parking assist apparatus that can calculate a parking route for guiding an own vehicle to a target parking position and park the own vehicle in parallel in a correct vehicle orientation at a position intended by a driver, without depending on an initial position where parking assistance is started or a vehicle orientation.

Solution to Problem

A parking assist apparatus of the present invention for solving the above problem is a parking assist apparatus that assists parallel parking of an own vehicle. The parking assist apparatus includes: a first route calculation unit configured to calculate a first route for moving the own vehicle from a target parking position to a virtual departure position based on a parking space and a constraint condition of own vehicle behavior; a second route calculation unit configured to calculate a second route for moving the own vehicle from an initial position where parking assistance is started to the virtual departure position; and a parking route setting unit configured to set a parking route of the own vehicle with use of the first route and the second route. The second route calculation unit include: a forward/backward movement determination unit configured to determine whether the initial position is on a front side or a rear side with respect to a first reference line extending along a longitudinal direction of the own vehicle at the virtual departure position; a backward movement starting route calculation unit configured to calculate a backward movement starting route that connects from the initial position to the virtual departure position by a backward movement of the own vehicle as the second route when the initial position is on a front side from the first reference line; and a forward movement starting route calculation unit configured to calculate a forward movement starting route that connects from the initial position to the virtual departure position by forward and backward movements of the own vehicle as the second route when the initial position is on a rear side from the first reference line or when it is impossible to calculate the backward movement starting route by the backward movement starting route calculation unit.

Advantageous Effects of Invention

According to the present invention, it is possible to calculate a parking route including turning back for guiding a vehicle to a target parking position and park the vehicle in parallel in a correct vehicle orientation at a position intended by a driver, without depending on an initial position where parking assistance is started and a vehicle orientation. Meanwhile, the problems, configurations, and effects other than those described above will be clarified by the description of the embodiment below.

BRIEF DESCRIPTION OF DRAWINGS

FIG. 12C is a view for explaining an example of connectability determination by one-side steering.

DESCRIPTION OF EMBODIMENTS

Hereinafter, an embodiment of the present invention will be described with reference to the drawings. It should be noted that, in the following description, a case where an own vehicle is parked in parallel on a left side from an initial position will be described as an example. However, the present invention can also be similarly applied to a case where the own vehicle is parked in parallel on a right side from the initial position.

Figure 1:
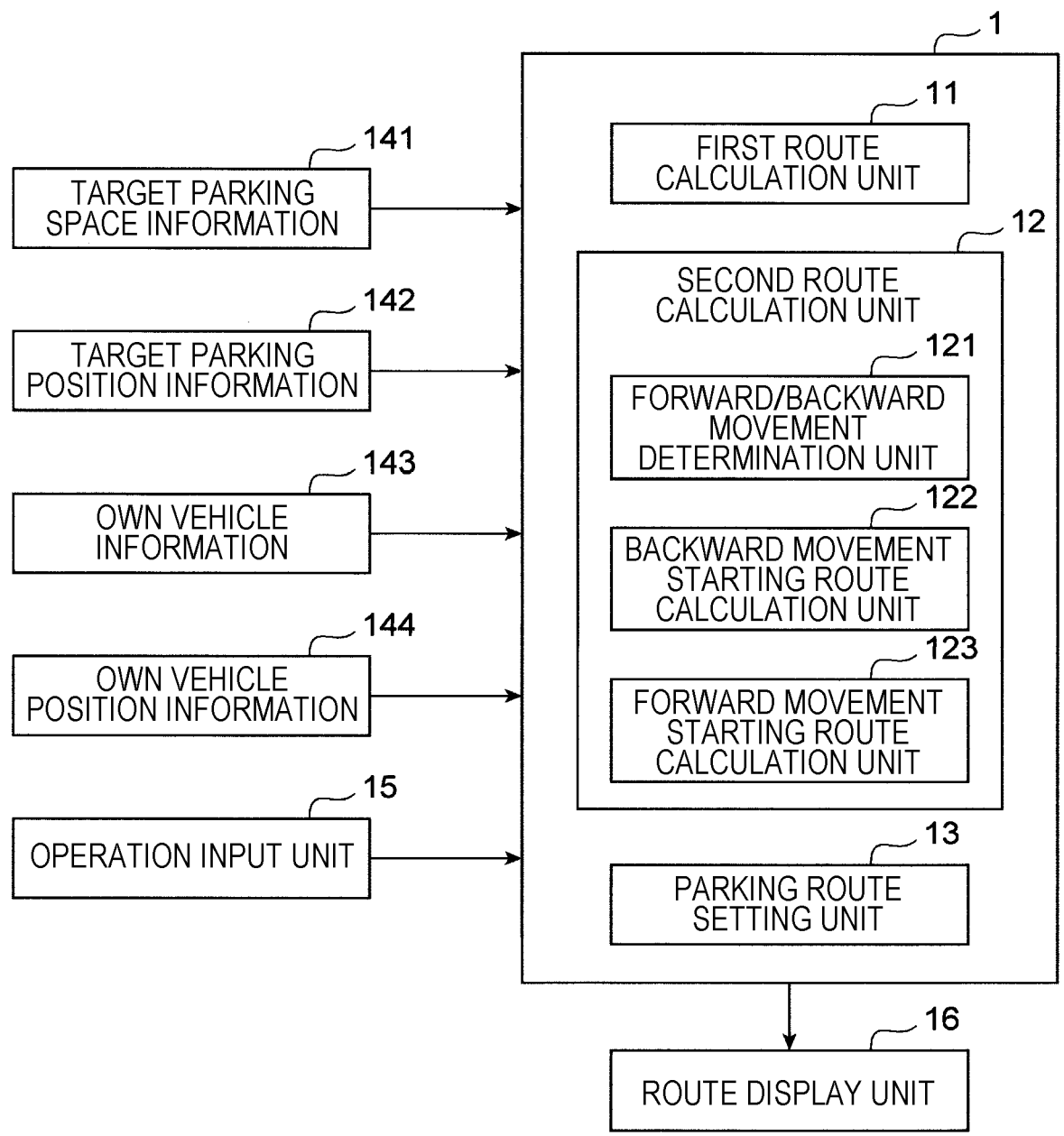
FIG. 1 is a functional block diagram of a parking assist apparatus according to an embodiment of the present invention.
Figure 2:
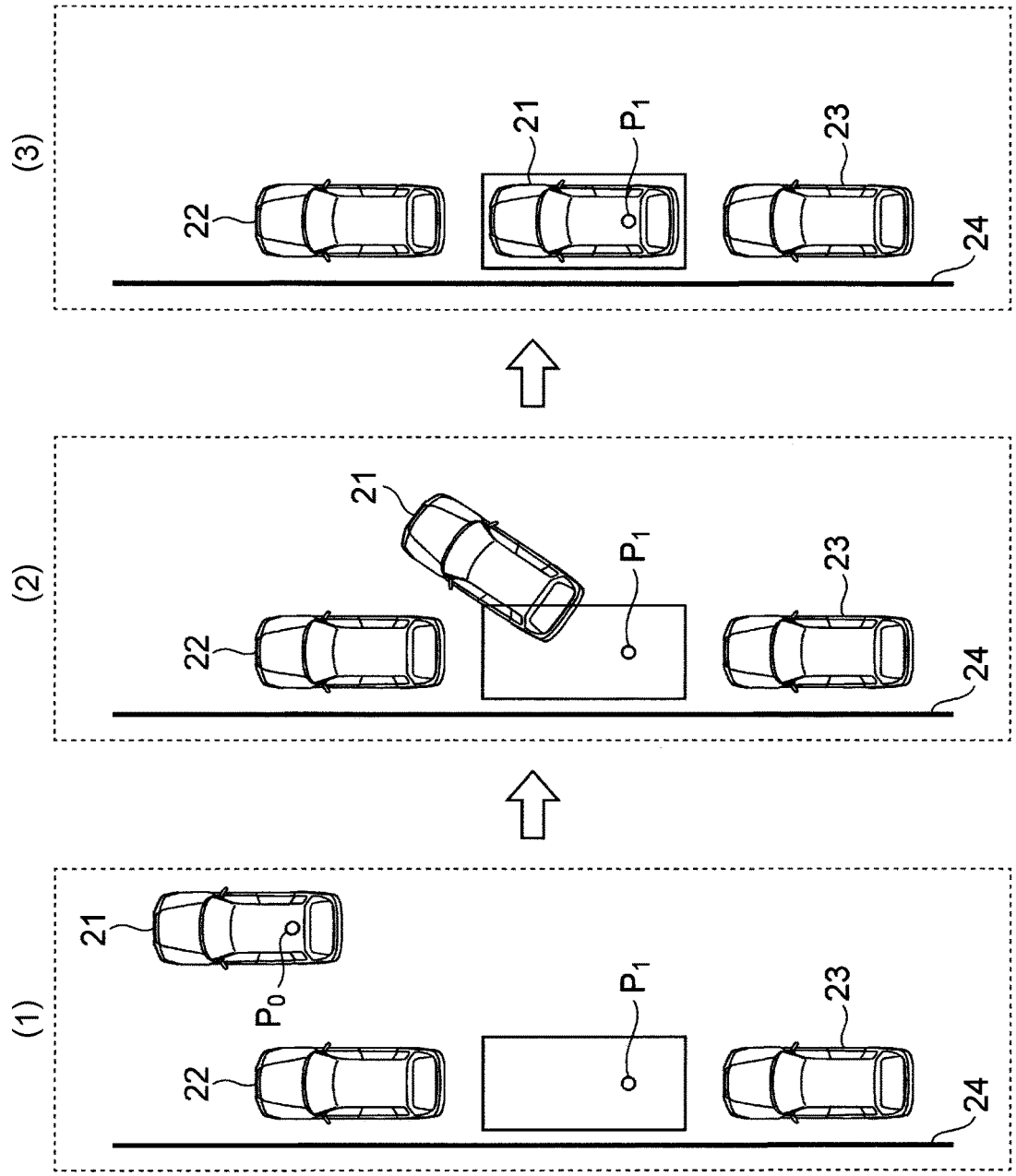
FIG. 2 is a view for explaining a movement of an own vehicle in parallel parking.

FIG. 1 is a functional block diagram of a parking assist apparatus according to an embodiment of the present invention, and FIG. 2 is a view for explaining a movement of the own vehicle in parallel parking.

In parallel parking, as shown in FIG. 2, for example, from a state where an own vehicle 21 is stopped at an initial position P0 ahead of a target parking position P1 (FIG. 2(1)), the own vehicle 21 is inserted from a rear portion thereof into between a front obstacle 22 and a rear obstacle 23 (FIG. 2(2)) by moving backward and turning to the left. Then, turning back is performed at least once or more, or a plurality of times as required, to arrange the own vehicle 21 with a direction thereof aligned with a parking direction at the target parking position P1 (FIG. 2(3)). For example, the front obstacle 22 and the rear obstacle 23 are other vehicles, and a side obstacle 24 is, for example, a curb or a wall. It should be noted that, in this embodiment, whether or not the own vehicle 21 is arranged at each position of the initial position P0, the target parking position P1, a turning-back end position P2 to be described later, and the virtual departure position P3, is determined based on a reference point that is an intermediate position between the left and right rear wheels of the own vehicle 21. Further, it is assumed that turning is performed along, for example, a clothoid curve.

A parking assist apparatus 1 of the present invention assists parallel parking of the own vehicle 21 from the initial position P0 to the target parking position P1, and the parking assist apparatus 1 is suitable to assist an operation of parallel parking such that at least one or more times of turning back are required, for example. The parking assist apparatus 1 can calculate a parking route for guiding the own vehicle 21 and can perform parallel parking by moving the own vehicle 21 along the calculated parking route. A system may be adopted in which information on the parking route is outputted from the parking assist apparatus 1, and the own vehicle 21 is parked in parallel at the target parking position P1 automatically or semi-automatically. In a semiautomatic operation, for example, a steering wheel operation is performed by automatic control, while an accelerator operation and a brake operation are performed by a driver.

The parking assist apparatus 1 is mounted on the own vehicle and realized by cooperation of hardware such as a microcomputer and a software program. As shown in FIG. 1, the parking assist apparatus 1 includes a first route calculation unit 11, a second route calculation unit 12, and a parking route setting unit 13.

The first route calculation unit 11 calculates a first route for moving the own vehicle from the target parking position P1 to the virtual departure position based on a parking space and a constraint condition of own vehicle behavior. The second route calculation unit 12 calculates a second route for moving the own vehicle 21 from the initial position P0 to the virtual departure position. The parking route setting unit 13 sets a parking route of the own vehicle 21 with use of the first route and the second route.

As shown in FIG. 1, the parking assist apparatus 1 is inputted with target parking space information 141, target parking position information 142, own vehicle information 143, and own vehicle position information 144. The target parking space information 141 includes information that is to be a constraint condition of the parking space, such as a distance to surrounding walls and other vehicles. The target parking position information 142 includes information such as a shape of the target parking position P1 and a relative position with respect to the own vehicle 21. The own vehicle information 143 includes information that is to be a constraint condition of own vehicle behavior such as a turning radius of the own vehicle. Then, as the own vehicle position information 144, there may be used a dead reckoning calculated in accordance with a vehicle model from a steering angle and a speed of the vehicle and a rotation amount of the wheel, and there may also be used position information obtained by a sensor such as a GPS or the like, or vehicle position information obtained by road-to-vehicle communication or inter-vehicle communication.

An operation input unit 15 inputs, for example, information and the like on the target parking position selected by a user into the parking assist apparatus 1. A route display unit 16 is an onboard monitor that can be seen by the driver in the vehicle, and can display a turning back position of the target parking route by superimposing on an image from the camera. Further, not only the turning back position but also the entire parking route may be displayed. The driver can look at and confirm the turning back position and the parking route displayed on the onboard monitor.

<First Route Calculation Unit>

The first route calculation unit 11 calculates the first route based on the target parking space information 141 such as an obstacle and the like in front and rear of the target parking position P1 where parallel parking is performed, the target parking position information 142 such as a shape and a position of the target parking position P1, and the own vehicle information 143 of vehicle specification such as a size of the own vehicle, a minimum rotation radius. The target parking space information 141 can be obtained from, for example, a detection signal of an ultrasonic sensor mounted on the own vehicle or an image from an onboard camera. Alternatively, the target parking space information 141 may be obtained by road-to-vehicle communication or inter-vehicle communication.

The first route is a virtual moving route obtained by estimating a route in a departure direction from a state where the own vehicle 21 is parked at the target parking position P1 to the virtual departure position P3, and the first route includes at least one or more times of turning back by the own vehicle 21. The first route is calculated based on a parking space and a constraint condition of own vehicle behavior. The first route is not bound by the initial position of the own vehicle 21 but is calculated irrelevant at all.

Figure 3:
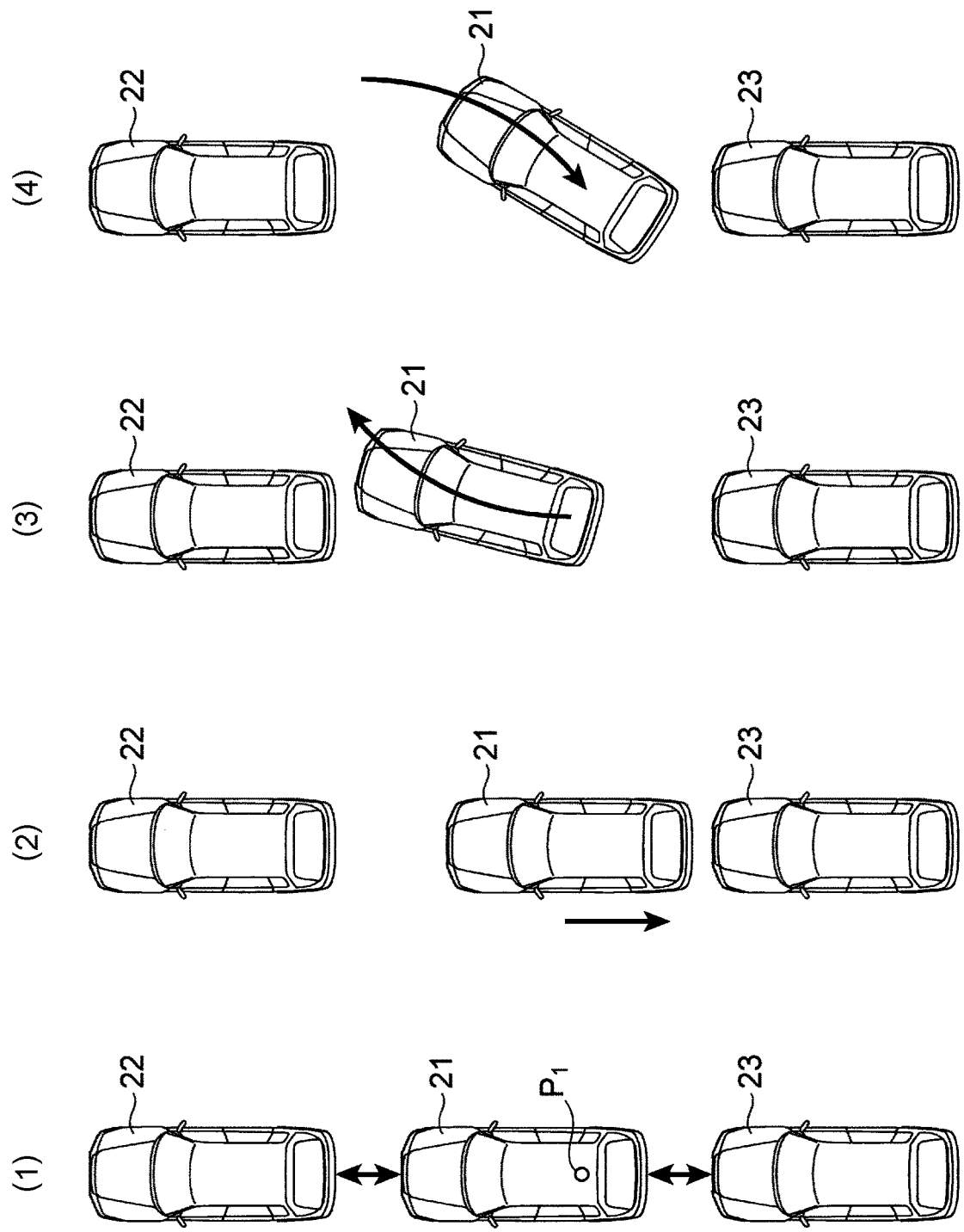
FIG. 3 is a view for explaining a calculation method of a first route.
Figure 4:
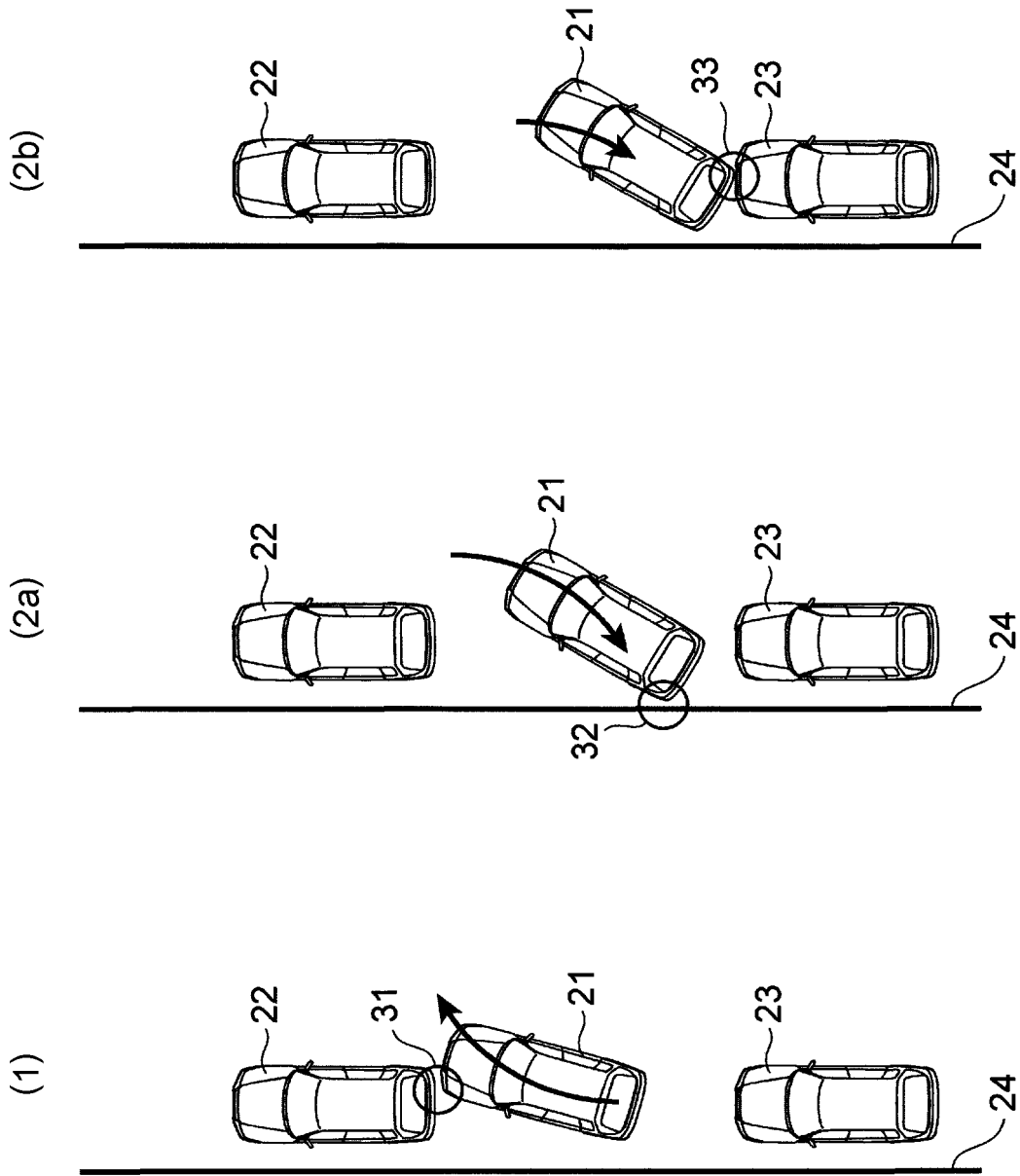
FIG. 4 is a view for explaining a position where switching between a forward movement and a backward movement of the first route is performed.
Figure 5:
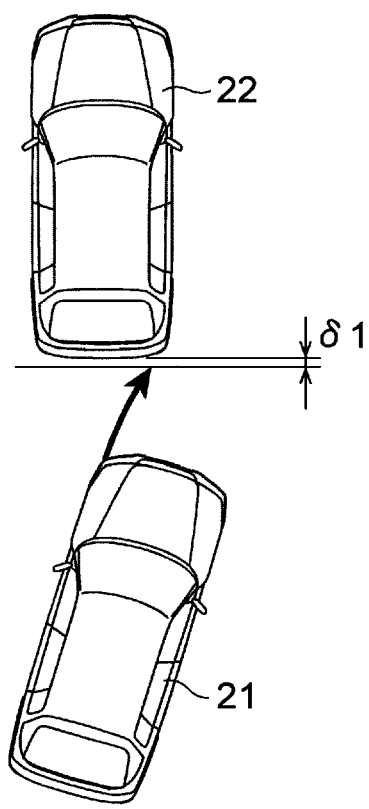
FIG. 5 is a view for explaining a moving amount during a forward movement.
Figure 6:
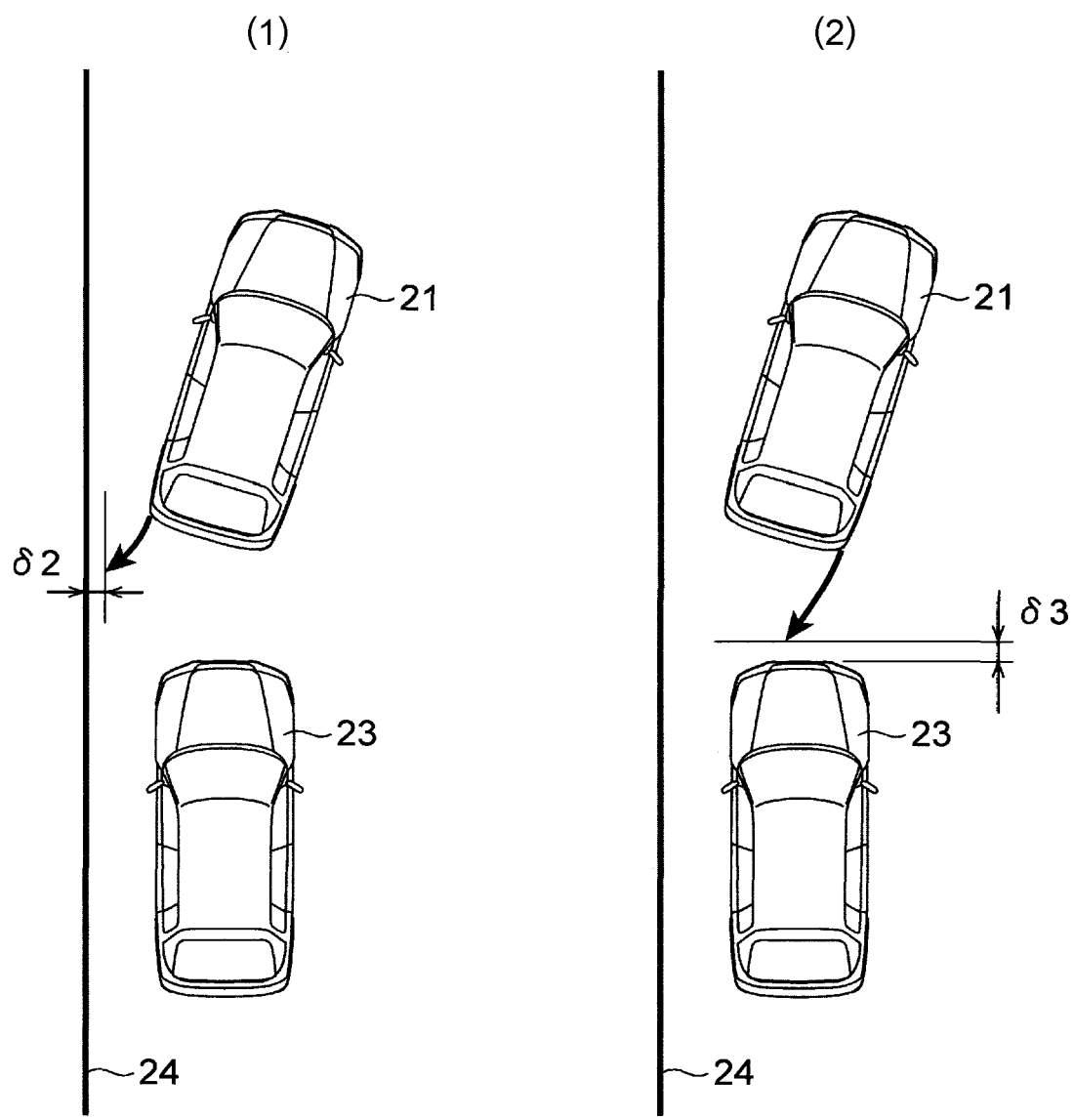
FIG. 6 is a view for explaining a moving amount during a backward movement.

FIG. 3 is a view for explaining a calculation method of the first route, FIG. 4 is a view for explaining a position where switching between a forward movement and a backward movement of the first route is performed, FIG. 5 is a view for explaining a moving amount during a forward movement, and FIG. 6 is a view for explaining a moving amount during a backward movement.

The first route calculation unit 11 straightly moves back the own vehicle 21 (FIG. 3(2)) from the target parking position P1 shown in FIG. 3(1), turns back at a backward movement possible limit position, and turns to the right while moving forward (FIG. 3(3)). Then, if the own vehicle cannot be brought out, the first route calculation unit 11 turns back at a forward movement possible limit position and turns to the left while moving backward (FIG. 3(4)), and alternately repeats the turning back shown in FIG. 3(3) and FIG. 3(4) until reaching a turning-back end position. Then, furthermore, a path when moving from a turning-back end position P2 shown in FIGS. 7(1a) and 7(1b) to the virtual departure position P3 shown in FIG. 7(2) is calculated as the first route.

As indicated by reference numeral 31 in FIG. 4(1), the first route calculation unit 11 sets, as the forward movement possible limit position, a position where a front portion of the own vehicle 21 approaches the front obstacle 22 by a limit distance. Then, out of a position where the rear portion of the own vehicle 21 approaches the side obstacle 24 by a limit distance as indicated by reference numeral 32 in FIG. 4(2a), or a position where the rear portion of the own vehicle 21 approaches the rear obstacle 23 by a limit distance as indicated by reference numeral 33 in FIG. 4(2b), either one with a shorter moving distance from the forward movement possible limit position is adopted as the backward movement limit position.

As shown in FIG. 5, the forward movement possible limit position is located before a position where the front portion of the own vehicle 21 comes into contact with the front obstacle 22 by a forward movement, for example, at a position separated by a predetermined gap δ1 of about 1 cm to 50 cm. Then, as shown in FIGS. 6(1) and 6(2), the backward movement possible limit position is located before a position where the rear portion of the own vehicle 21 comes into contact with the side obstacle 24 or the rear obstacle 23 by a backward movement, for example, at a position separated by predetermined gaps δ2 and δ3 of about 5 cm to 10 cm.

Figure 7:
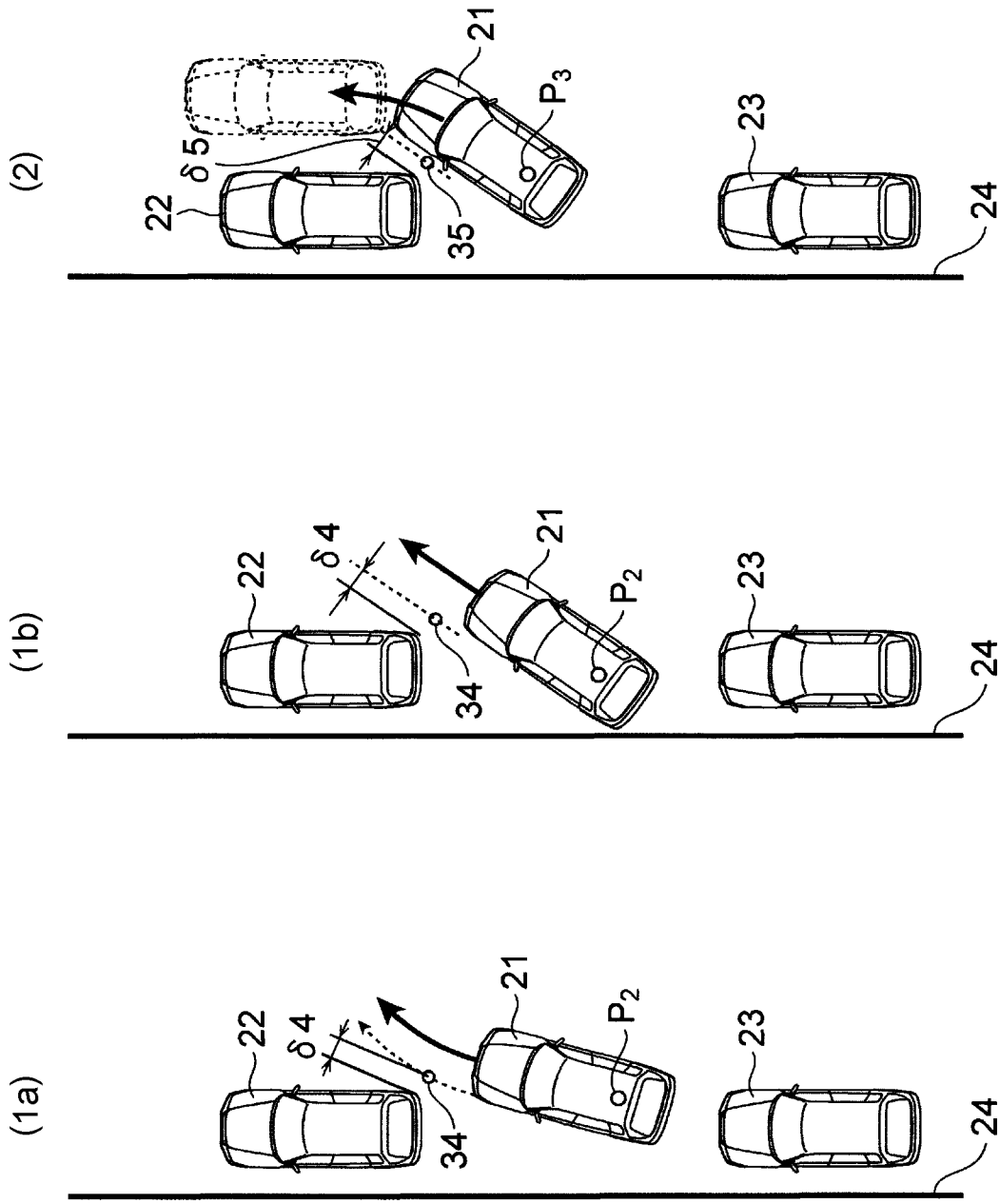
FIG. 7 is a view for explaining a turning-back end position and a virtual departure position.

FIG. 7 is a view for explaining the turning-back end position and the virtual departure position.

The first route calculation unit 11 calculates the turning-back end position P2 and the virtual departure position P3. The turning-back end position P2 is a position where the own vehicle 21 can move to the right side from the front obstacle 22 in the parking direction without a left front portion of the own vehicle 21 contacting the front obstacle 22 in the first route.

As shown in FIGS. 7(1a) and 7(1b), the turning-back end position P2 have two patterns of: the backward movement possible limit position where the own vehicle 21 can pass through a passing point 34 having a gap δ4 between with the front obstacle 22 when the own vehicle turns to the right while moving forward; or the backward movement possible limit position where the own vehicle 21 can pass through the passing point 34 when the own vehicle straightly moves forward. The gap δ4 has a margin in consideration of an error or the like to prevent contact with the front obstacle 22, and is preferably as small as possible, for example, set to about 1 cm to 50 cm.

As shown in FIG. 7(2), the virtual departure position P3 is a position where the own vehicle 21 can pass through a passing point 35 having a predetermined gap δ5 between with the front obstacle 22 and be arranged in parallel in the same direction as the parking direction when the own vehicle 21 is moved forward from the turning-back end position P2 and turned to the left. The gap δ5 has a margin in consideration of an error or the like to prevent contact with the front obstacle 22, and is preferably as small as possible, for example, set to about 1 cm to 50 cm.

<Second Route Calculation Unit>

The second route calculated by the second route calculation unit 12 is a virtual moving route obtained by estimating a route in an entry direction on which the own vehicle 21 reaches the virtual departure position P3 from the initial position P0. One of the backward movement starting route and the forward movement starting route is selected as the second route in accordance with the initial position P0 of the own vehicle 21.

As shown in FIG. 1, the second route calculation unit 12 includes a forward/backward movement determination unit 121, a backward movement starting route calculation unit 122, and a forward movement starting route calculation unit 123.

Figure 8:
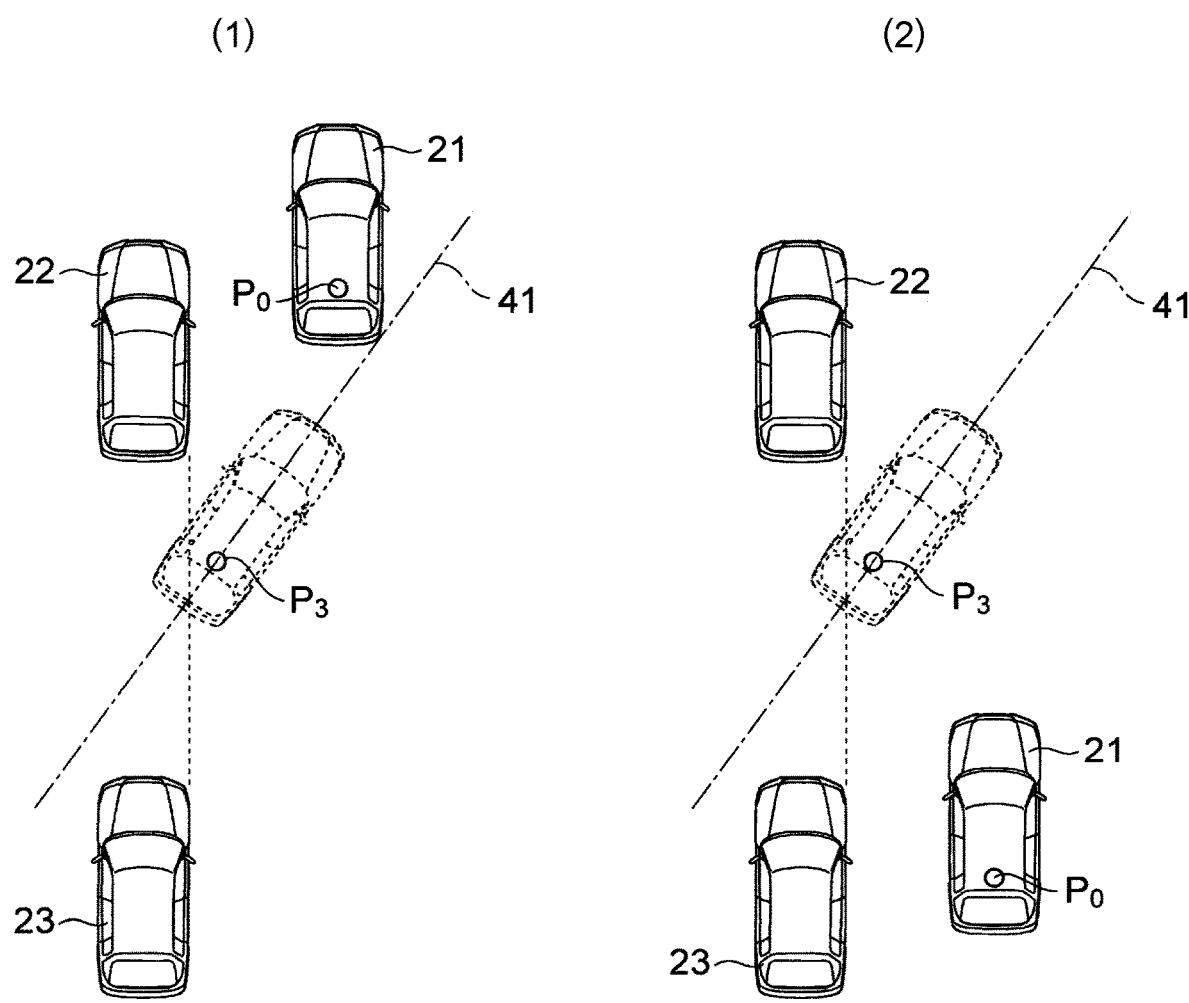
FIG. 8 is a view for explaining a determination method with a forward/backward movement determination unit.

FIG. 8 is a view for explaining a determination method with the forward/backward movement determination unit.

The forward/backward movement determination unit 121 determines whether the initial position P0 is on a front side or a rear side in the parking direction with respect to a first reference line 41 extending along a longitudinal direction of the own vehicle 21 at the virtual departure position P3.

As shown in FIG. 8(1), when the initial position P0 is on a front side in the parking direction with respect to the first reference line 41, the backward movement starting route calculation unit 122 calculates the backward movement starting route that connects from the initial position P0 to the virtual departure position P3 by a backward movement of the own vehicle 21. However, calculation of the backward movement starting route may not be possible due to a constraint of own vehicle behavior.

When the initial position P0 is on a rear side in the parking direction with respect to the first reference line 41 as shown in FIG. 8(2), or when calculation of the backward movement starting route is not possible with the backward movement starting route calculation unit 122, the forward movement starting route calculation unit 123 calculates the forward movement starting route that connects from the initial position P0 to the virtual departure position P3 by a forward movement and a backward movement of the own vehicle 21. The second route calculation unit 12 selects the backward movement starting route as the second route when the backward movement starting route is calculated by the backward movement starting route calculation unit 122, and selects the forward movement starting route as the second route when the forward movement starting route is calculated by the forward movement starting route calculation unit 123.

Figure 9:
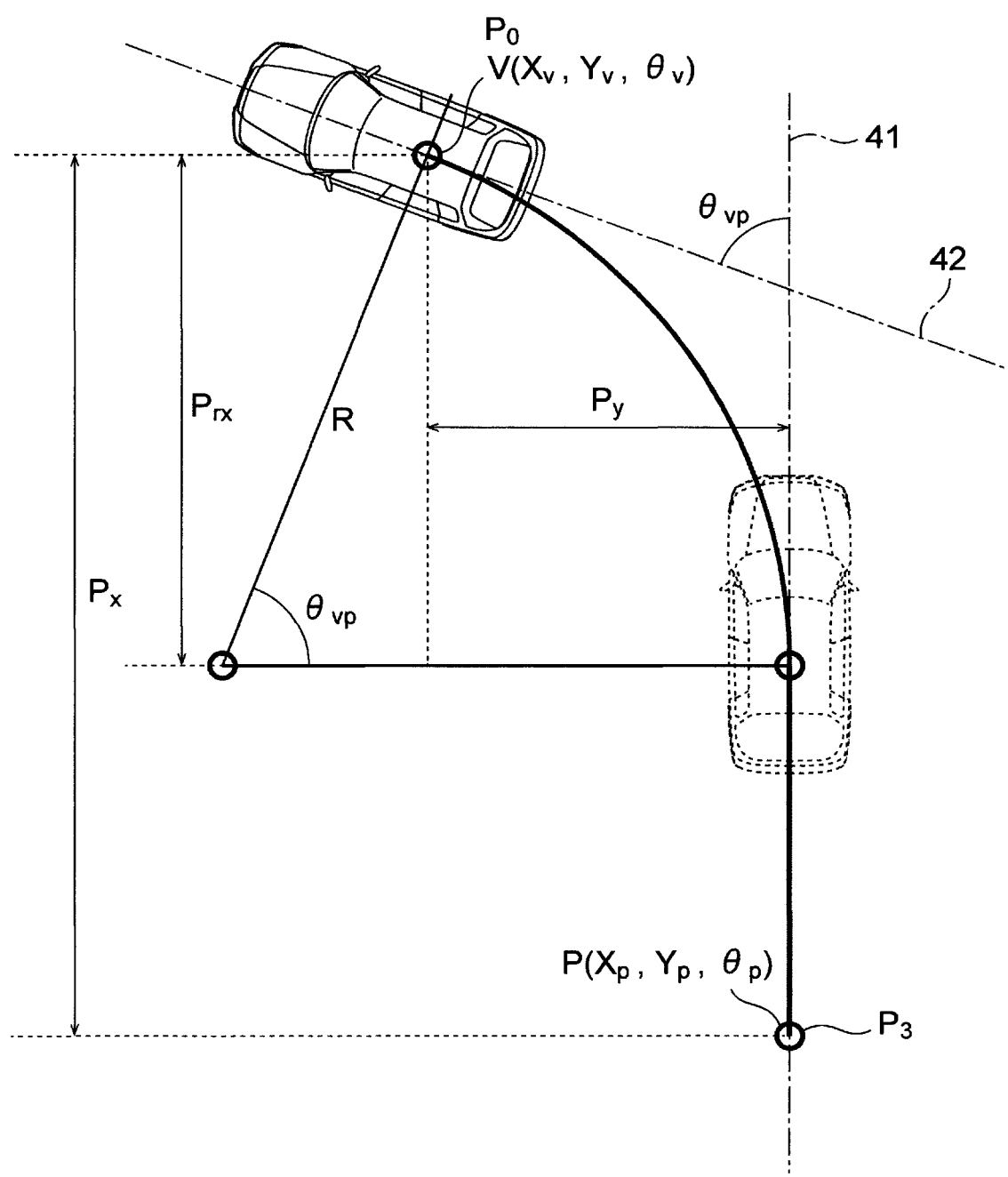
FIG. 9 is a view for explaining a calculation method of a second route in a case where a start of a backward movement is possible.

FIG. 9 is a view for explaining a calculation method of the backward movement starting route.

When a relationship between the initial position P0 and the virtual departure position P3 satisfies both of the following two conditions (A) and (B), the backward movement starting route calculation unit 122 determines that a backward movement can be started.

$$R_{min} \leq R = \frac{P_y}{\sin\theta_{vp} \cdot \tan\frac{\theta_{vp}}{2}} \quad \text{CONDITION (A)}$$

$$P_x \geq P_{rx} = \sqrt{R^2 - (R - P_y)^2} \quad \text{CONDITION (B)}$$

Here, Rmin is a minimum rotation radius of the own vehicle 21. A coordinate of the initial position P0 is defined as V (Xv, Yv, θv), a coordinate of the virtual departure position P3 is defined as P (Xp, Yp, θp), and an included angle between the first reference line 41 and a second reference line 42 is defined as θvp.

When both of the above conditions (A) and (B) are satisfied, the own vehicle 21 can start a backward movement from the initial position P0 to be connected to the virtual departure position P3 only by moving backward, that is, it is determined that a backward movement can be started. When it is determined that a backward movement can be started, for example, as shown in FIG. 9, the own vehicle 21 can be connected to the virtual departure position P3 by moving backward with a radius R from the initial position P0, turning to the left, being connected to the first reference line 41, and straightly moving backward along the first reference line 41. That is, a direction of the own vehicle 21 can be arranged along the first reference line 41 at the virtual departure position P3. In such a case, the backward movement starting route calculation unit 122 sets a route consisted of a circular arc portion by the turning and a straight portion by the straight backward movement, as a backward movement starting route.

Whereas, when at least one of the above conditions (A) or (B) is not satisfied, the own vehicle 21 cannot be connected to the virtual departure position P3 only by moving backward, and it is determined that a backward movement cannot be started. In such a case, the forward movement starting route calculation unit 123 calculates the forward movement starting route, the own vehicle 21 is moved forward from the initial position P0 to move to a connection candidate position, and a route from the connection candidate position to the virtual departure position P3 is calculated.

The forward movement starting route calculation unit 123 sets a connection candidate position P5 on the second reference line 42 passing through the initial position P0 and extending parallel to the parking direction (connection candidate position setting unit). Then, the forward movement starting route calculation unit 123 calculates a forward movement route that connects from the initial position P0 to the connection candidate position P5 by a forward movement of the own vehicle 21, and a backward movement route that connects from the connection candidate position P5 to the virtual departure position P3 by a backward movement of the own vehicle 21, and the forward movement starting route calculation unit 123 connects the forward movement route and the backward movement route to form a forward movement starting route.

Figure 10:
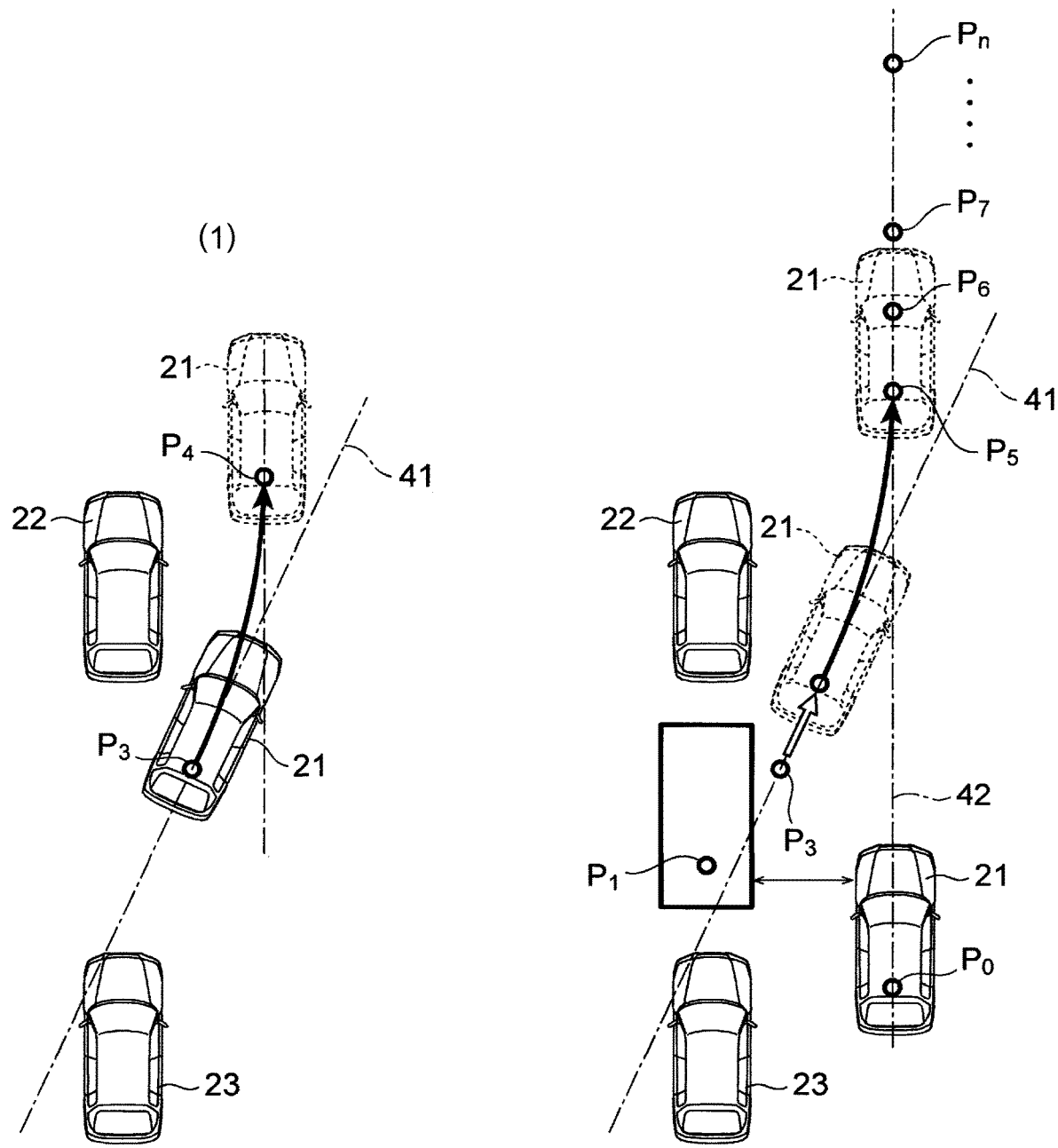
FIG. 10 is a view for explaining a calculation method of the second route in a case of starting a forward movement.

FIG. 10 is a view for explaining a calculation method of the forward movement starting route.

As shown in FIG. 10(1), the forward movement starting route calculation unit 123 calculates a position P4 in which the direction of the own vehicle 21 becomes parallel to the parking direction by moving forward and turning from the virtual departure position P3. The position P4 can be set, for example, on a route passing with a predetermined interval $\delta 5$ (see FIG. 7(2)) between with the front obstacle 22. Then, the position P4 is moved in parallel along the first reference line 41, and a position where the position P4 is placed on the second reference line 42 is set as the connection candidate position P5 as shown in FIG. 10(2). The own vehicle 21 can move backward from the connection candidate position P5 and is connected to the first reference line 41 by turning, and can be connected to the virtual departure position P3 by moving straight back along the first reference line 41.

The forward movement starting route calculation unit 123 calculates a route of the own vehicle 21 from the connection candidate position P5 to the virtual departure position P3 as a backward movement route. Then, the forward movement starting route calculation unit 123 calculates a forward movement route that connects from the initial position P0 to the connection candidate position P5 by a forward movement of the own vehicle 21. When the forward movement route that connects from the initial position P0 to the connection candidate position P5 can be calculated, the forward movement route from the initial position P0 to the connection candidate position P5 and the backward movement route from the connection candidate position P5 to the virtual departure position P3 are connected to form the forward movement starting route.

Whereas, for example, when the direction of the own vehicle 21 at the initial position P0 is greatly inclined with respect to the parking direction, or when a distance between the initial position P0 and the connection candidate position P5 is too short, there is a possibility that the forward movement route that connects from the initial position P0 to the connection candidate position P5 cannot be calculated due to a constraint of the own vehicle behavior.

In this way, when the forward movement route that connects to the connection candidate position P5 cannot be calculated, calculation is performed on the forward movement route to be connected from the initial position P0 by a forward movement of the own vehicle 2, by selecting any one of a plurality of other connection candidate positions P6, P7, . . . , Pn. The plurality of other connection candidate positions P6, P7, . . . , Pn are located on the second reference line 42 with a predetermined interval (e.g., an interval of 1 m), and are arranged so as to be separated toward a front side in the parking direction with the connection candidate position P5 as a reference. The plurality of other connection candidate positions P6, P7, . . . , Pn are set such that a priority of selection is lowered as the position is away from the connection candidate position P5, a determination is made as to whether or not connection is possible from the one closer to the initial position P0, and the one that is as close as possible to the initial position P0 is to be selected in order to shorten a time required for parking as much as possible.

Figure 11:
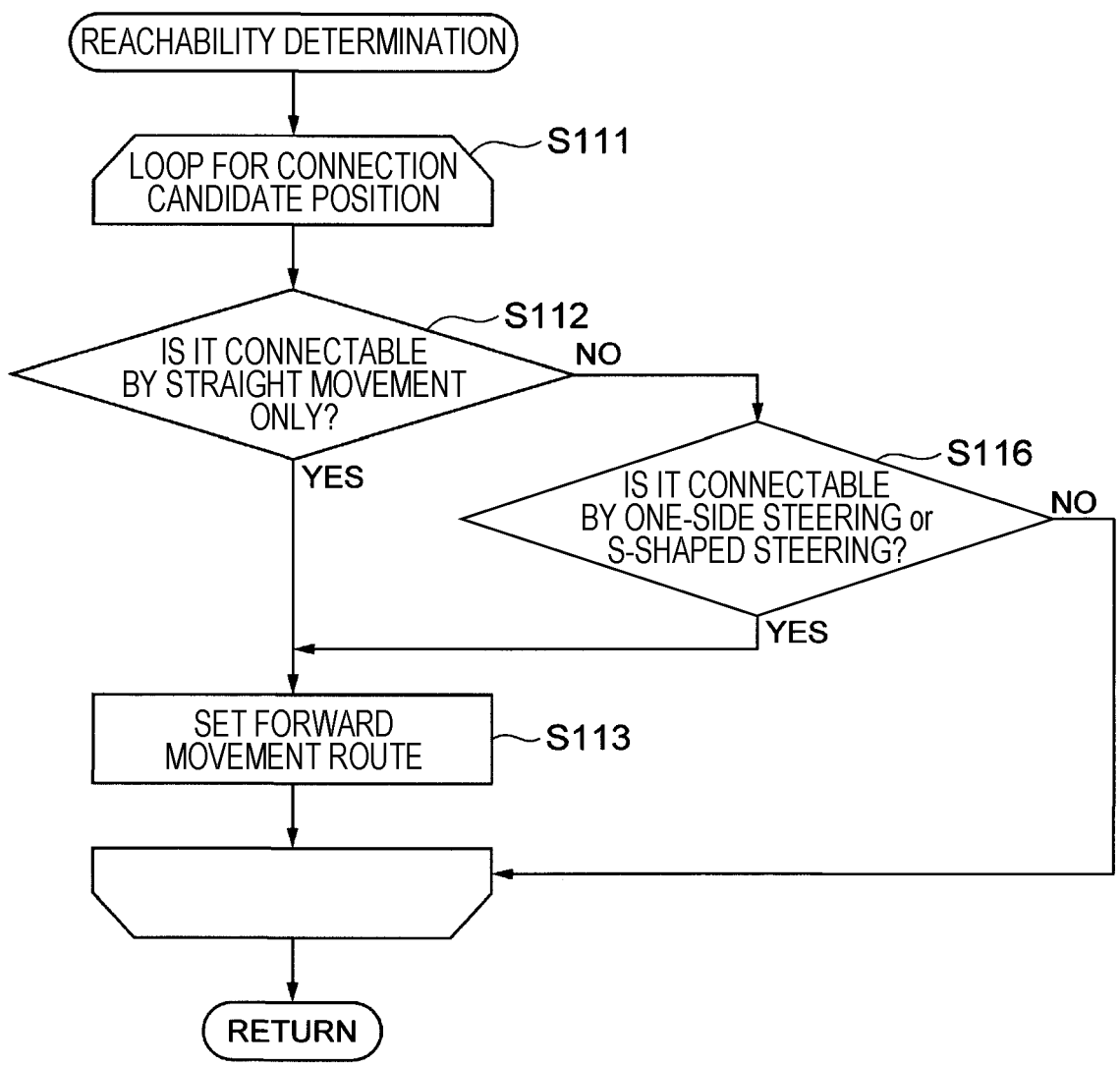
FIG. 11 is a processing flow of connectability determination.

FIG. 11 is a processing flow of connectability determination for determining whether it is possible to connect from the initial position to the connection candidate position by a forward movement of the own vehicle.

This processing flow is looped until the connection candidate position connectable to the initial position P0 is found, and it is determined sequentially from the connection candidate position P5 (S111). First, it is determined whether or not it is possible to connect from the initial position P0 to the connection candidate position P5 by a straight movement only (S112). For example, as shown in FIG. 10(2), when the direction of the own vehicle 21 is parallel to the parking direction, it is determined that the vehicle can be connected only by a straight movement. When it is determined that the vehicle can be connected only by a straight movement, the route of the own vehicle 21 from the initial position P0 to the connection candidate position P5 is set as the forward movement route (S113).

Whereas, when the direction of the own vehicle 21 is inclined with respect to the parking direction, and it is determined that it is impossible to connect to the connection candidate position P5 only by a straight movement, it is determined whether or not it is possible to connect to the connection candidate position P5 by one-side steering or S-shaped steering (S116). The one-side steering is an operation to steer a steering wheel only to one of the left and right sides, and the S-shaped steering is an operation to steer a steering wheel to the left and right sides both.

Then, when it is determined that it is possible to connect to the connection candidate position P5 by the one-side steering or the S-shaped steering, such the connection candidate position P5 is selected, and a route of the own vehicle 21 from the initial position P0 to the connection candidate position P5 is set as the forward movement route (S113).

Further, when it is determined that it is impossible to connect to the connection candidate position P5, it is determined whether or not it is possible to connect to another connection candidate position P6 by one-side steering or S-shaped steering. Then, the determination is sequentially made in accordance with the priority, a connectable candidate position is selected, and a route to the connection candidate position is set as the forward movement route.

Figure 12A:
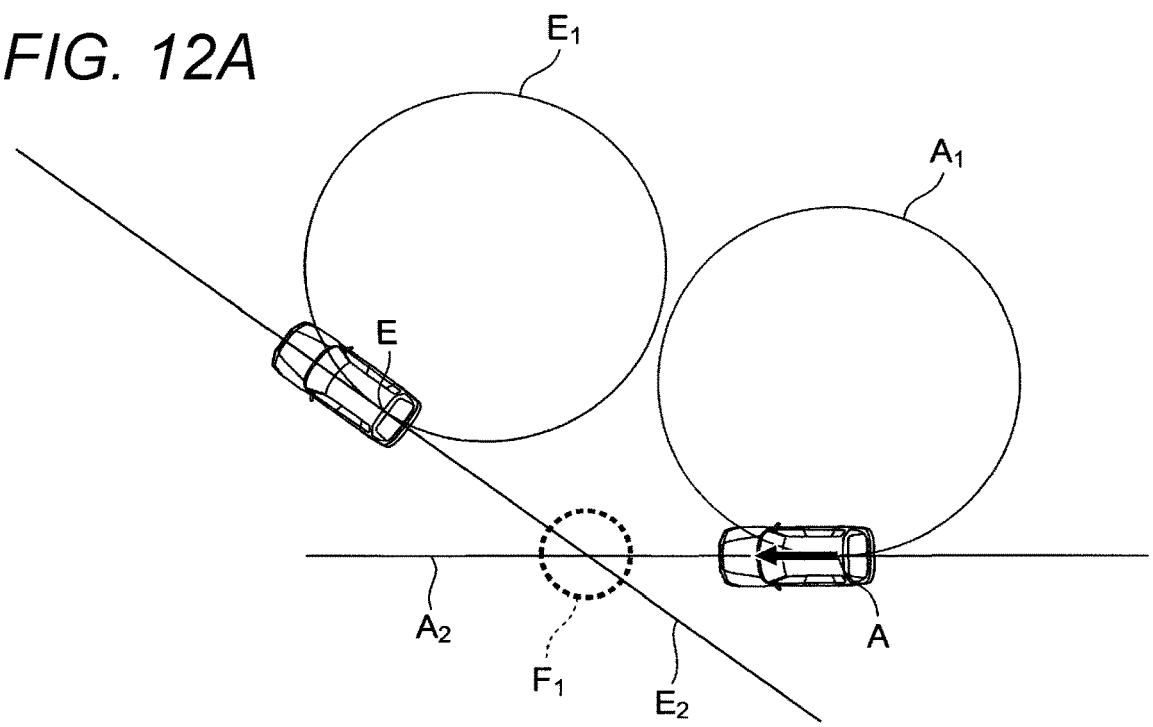
FIG. 12A is a view for explaining an example of connectability determination by one-side steering.
Figure 12B:
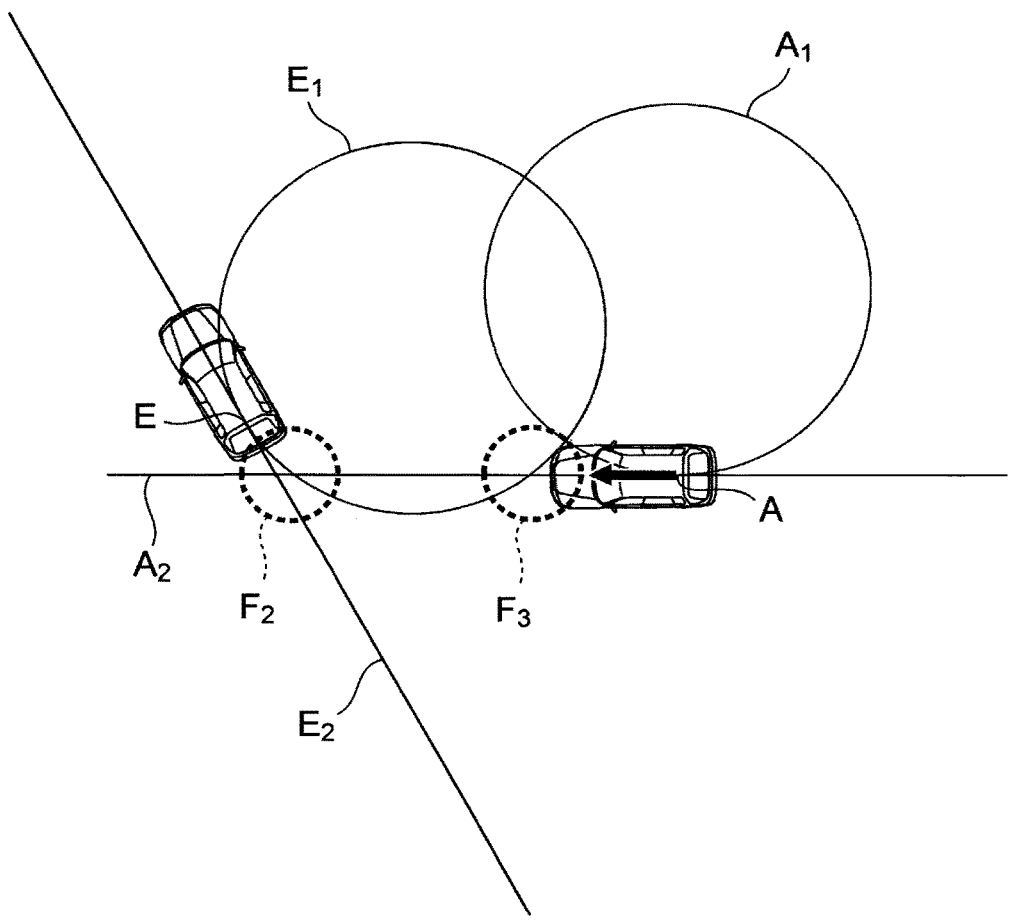
FIG. 12B is a view for explaining an example of connectability determination by one-side steering.
Figure 12D:
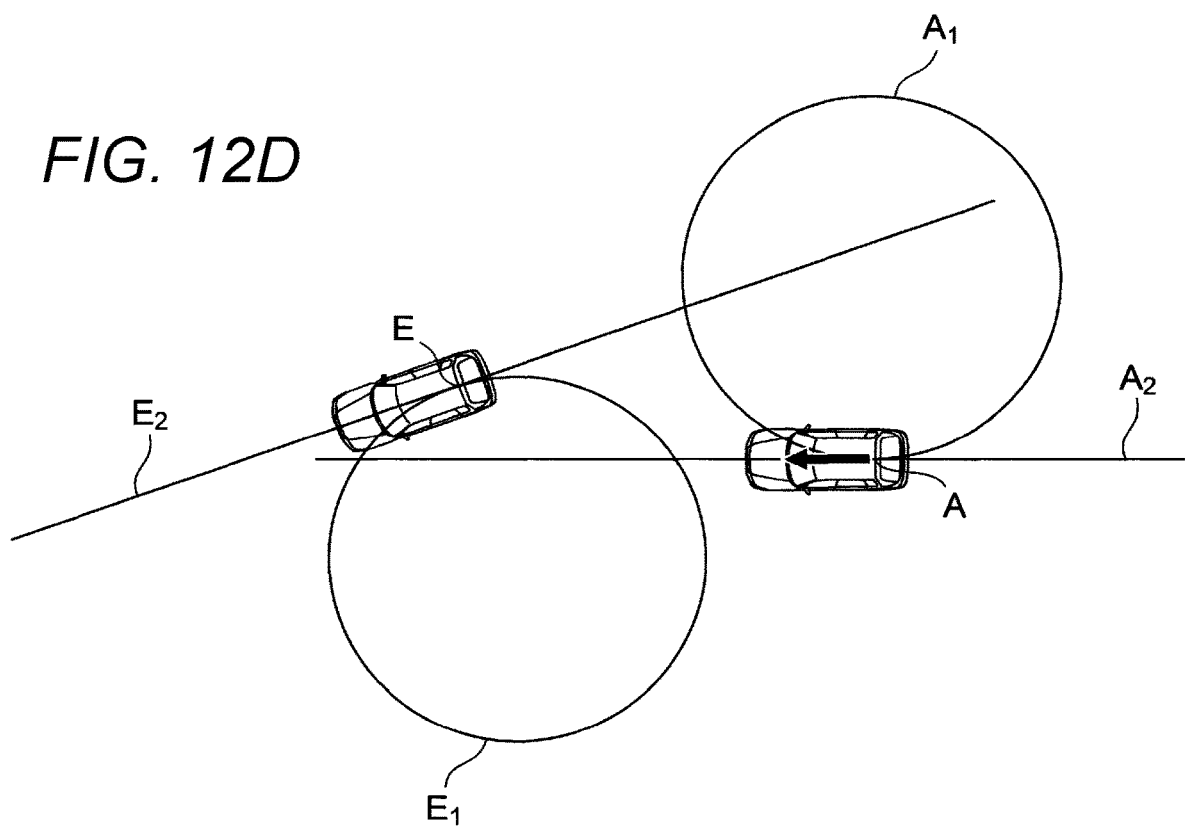
FIG. 12D is a view for explaining an example of connectability determination by S-shaped steering.
Figure 12E:
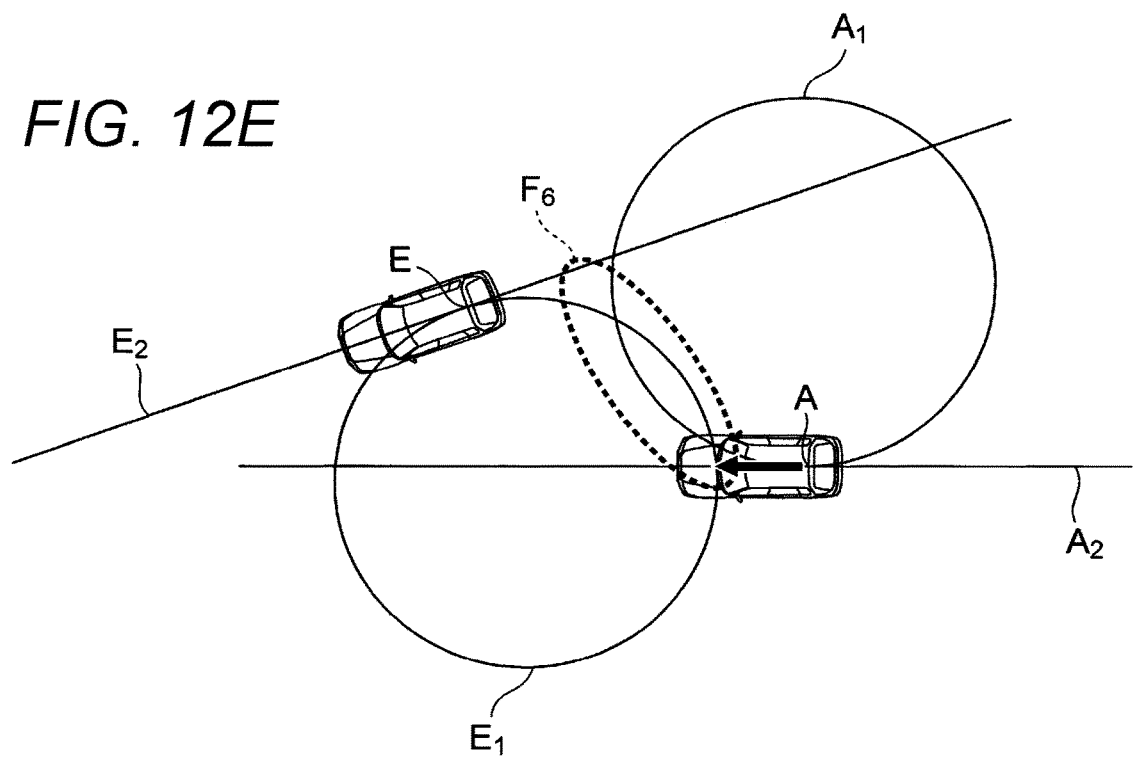
FIG. 12E is a view for explaining an example of connectability determination by S-shaped steering.

FIGS. 12A to 12C are views for explaining an example of connectability determination by one-side steering, and FIGS. 12D and 12E are views for explaining an example of connectability determination by S-shaped steering.

In the connectability determination by one-side steering in S112, connection is determined to be possible when all the following conditions (a1) to (a3) are satisfied (also limited by an angular difference and a position).

(a1) A longitudinal axis A2 of the own vehicle 21 at an initial position A of the own vehicle 21 and a longitudinal axis E2 of the own vehicle 21 at a connectable position E intersect.

(a2) A turning circle A1 at the initial position A and the axis E2 at the connectable position E do not intersect.

(a3) A turning circle E1 at the connectable position E and the axis A2 of the initial position A do not intersect.

It should be noted that the turning circle is a circular arc (minimum rotation path) on a turning side in consideration of clothoid.

In the example shown in FIG. 12A, since the axes A2 and E2 intersect at an intersecting position F1, the condition of (a1) above is satisfied. Therefore, it is determined that connection by one-side steering is possible. Whereas, in FIG. 12B, since the turning circle E1 and the axis A2 at the initial position intersect, the condition of (a3) above is not satisfied. Then, in the example shown in FIG. 12C, since the turning circle A1 at the initial position and the axis E2 at the connectable position E intersect, the condition of (a2) above is not satisfied. Therefore, in the examples shown in FIG. 12B and FIG. 12C, connection is determined to be impossible by one-side steering, and the process proceeds to determination as to whether or not S-shaped steering can be used.

In the connectability determination by S-shaped steering in S116, connection is determined to be possible when the following condition (a4) is satisfied (also limited by an angular difference and a position).

(a4) The turning circle A1 at the initial position A and the turning circle E1 at the connectable position E do not intersect.

In the example shown in FIG. 12D, since the turning circle A1 and the turning circle E1 do not intersect, the condition is satisfied. Therefore, it is determined that connection is possible by S-shaped steering. Whereas, in the example shown in FIG. 12E, since the turning circle A1 and the turning circle E1 intersect, the condition is not satisfied, and connection by the S-shaped steering is determined to be impossible.

Figure 13:
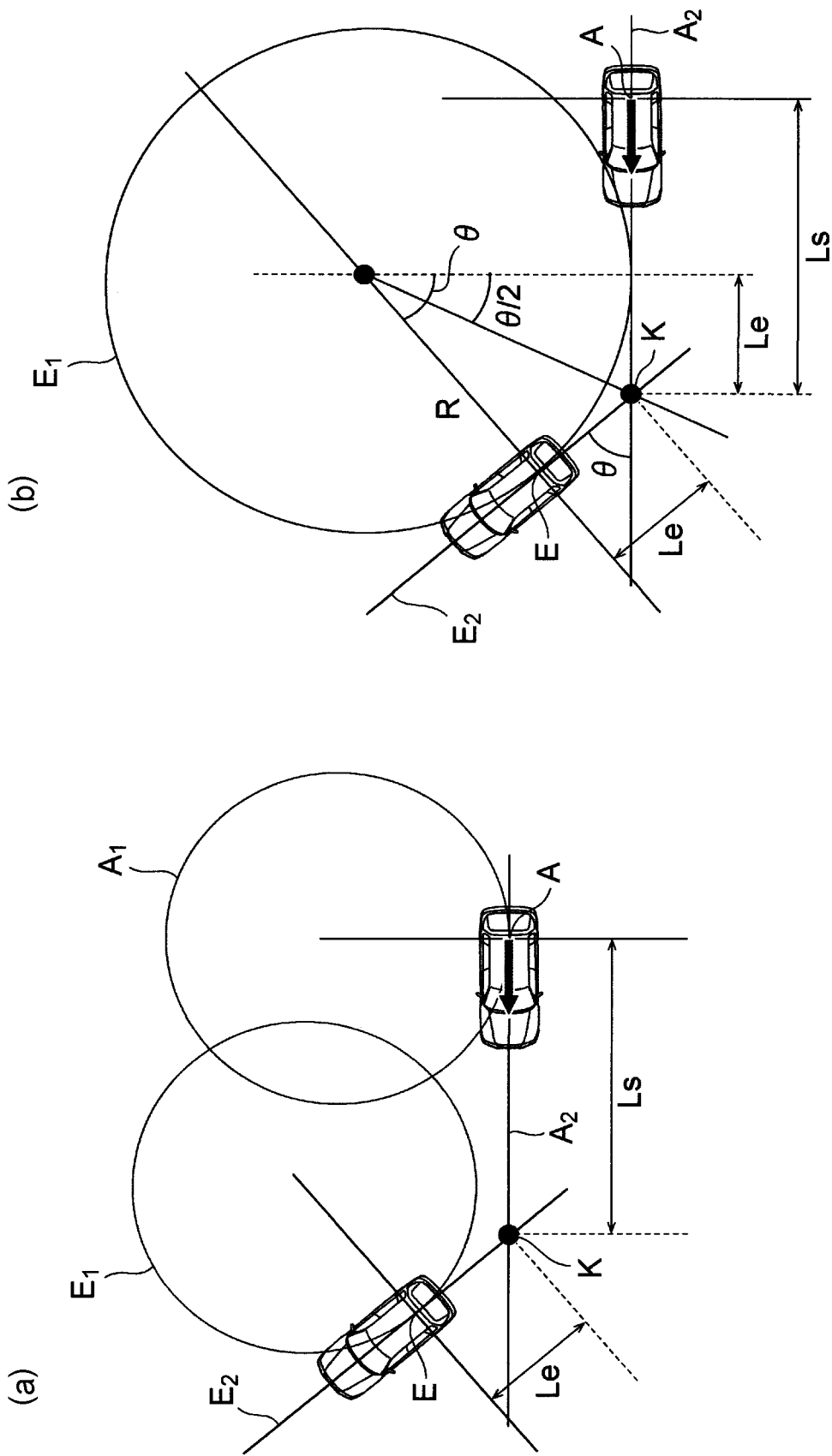
FIG. 13 is a view for explaining a generation method of a forward route by one-side steering.

FIG. 13 is a view for explaining a generation method of a forward route by one-side steering.

In order to generate a route by one-side steering from the initial position A to the connectable position E, first, as shown in FIG. 13(a), a distance Ls between the initial position A and an intersection point K of the axis A2 and the axis E2, and a distance Le between the intersection point K and the connectable position E are respectively calculated, and a shorter distance is selected (in the example shown in the figure, the distance Le is selected). Then, as shown in FIG. 13(b), a radius R is calculated from geometric calculation with the following Expression (1) by drawing a circle having two axes A2 and E2 as a common tangent line and passing through a position separated by a shorter distance from the intersection point K.

[Mathematical Formula 1]

$$R = \frac{L_e}{\tan\frac{\theta}{2}} \quad (1)$$

As a result of the above, it is possible to generate a forward route combining a straight line and an arc.

Figure 14:
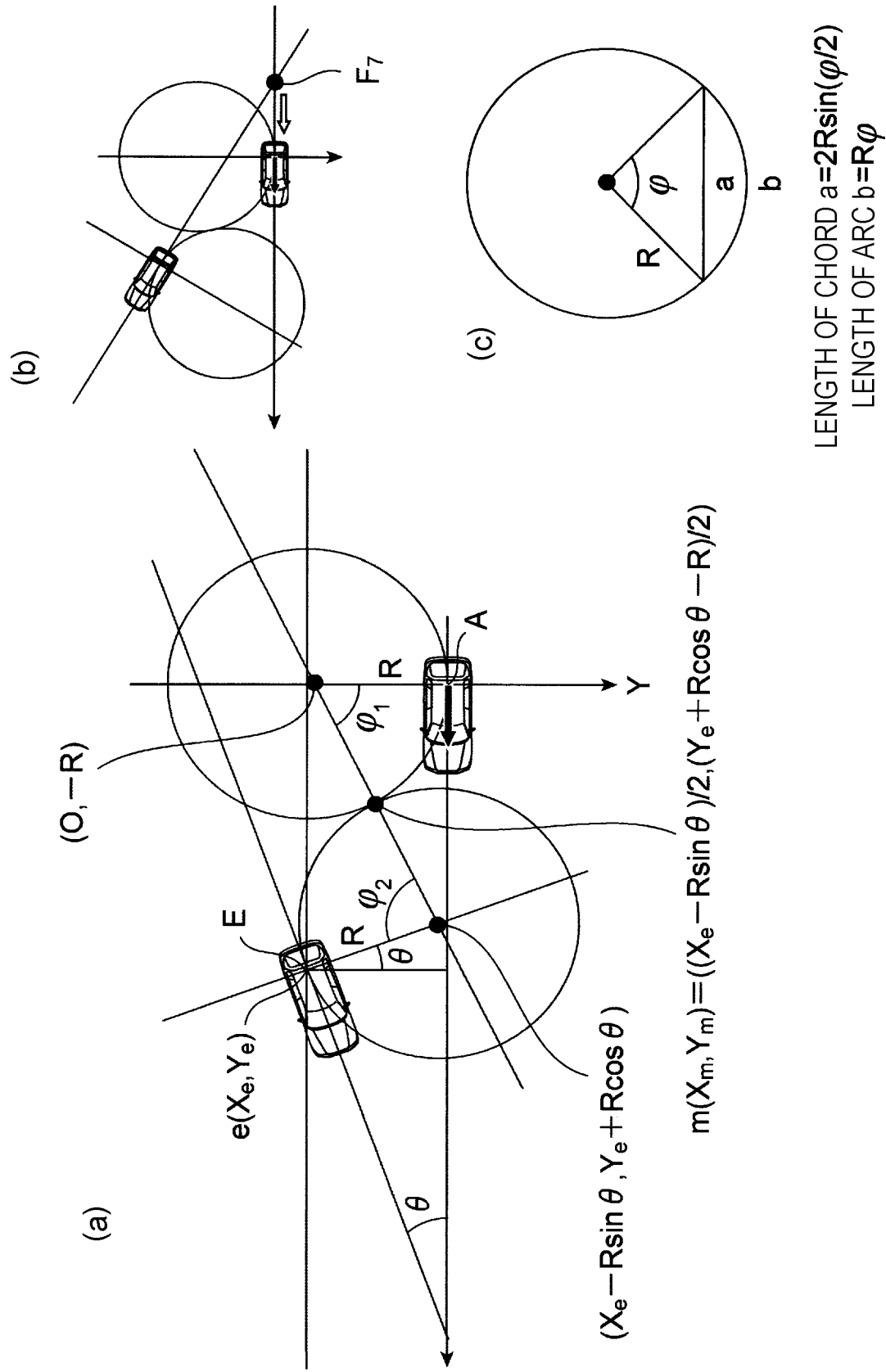
FIG. 14 is a view for explaining a generation method of a forward route by S-shaped steering.

FIG. 14 is a view for explaining a generation method of a forward route by S-shaped steering, and is a view for explaining a generation method in a case where the axis E2 does not intersect with an X axis, which is the axis E2 of the initial position A, on a rear side from the connectable position E.

Here, a radius R of a common circle having the same radius for drawing an S-shape is calculated. If a contact point of the circle is obtained, a forward route of S-shape can be generated by combining a circular arc of the turning circle A1 and a circular arc of the turning circle E1.

The radius of the common circle is obtained from a distance between center coordinates since the center coordinate of each circle is obtained.

[Mathematical Formula 2]

$$2R = \sqrt{(X_e - R\sin\theta)^2 + (Y_e + R\cos\theta + R)^2} \quad (2)$$

[Mathematical Formula 3]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (3)$$

However, when θ=0,

[Mathematical Formula 4]

$$R = -\frac{X_e^2 + Y_e^2}{4Y_e} \quad (4)$$

The above calculation formula can calculate from a state shown in FIG. 14(a) to a position of an intersection point F7 shown in FIG. 14(b).

From the formula shown in FIG. 14(c), respective turning angles φ1 and φ2 and arc lengths b1 and b2 of the S-shape can be obtained by the following calculation formula.

[Mathematical Formula 5]

$$\varphi_1 = 2\sin^{-1}\left(\frac{\sqrt{X_m^2 + Y_m^2}}{2R}\right) \quad (5)$$

[Mathematical Formula 6]

$$b_1 = 2R\sin^{-1}\left(\frac{\sqrt{X_m^2 + Y_m^2}}{2R}\right) \quad (6)$$

[Mathematical Formula 7]

$$\varphi_2 = 2\sin^{-1}\left(\frac{\sqrt{(X_m - X_e)^2 + (Y_m - Y_e)^2}}{2R}\right) \quad (7)$$

[Mathematical Formula 8]

$$b_2 = 2R\sin^{-1}\left(\frac{\sqrt{(X_m - X_e)^2 + (Y_m - Y_e)^2}}{2R}\right) \quad (8)$$

Figure 15:
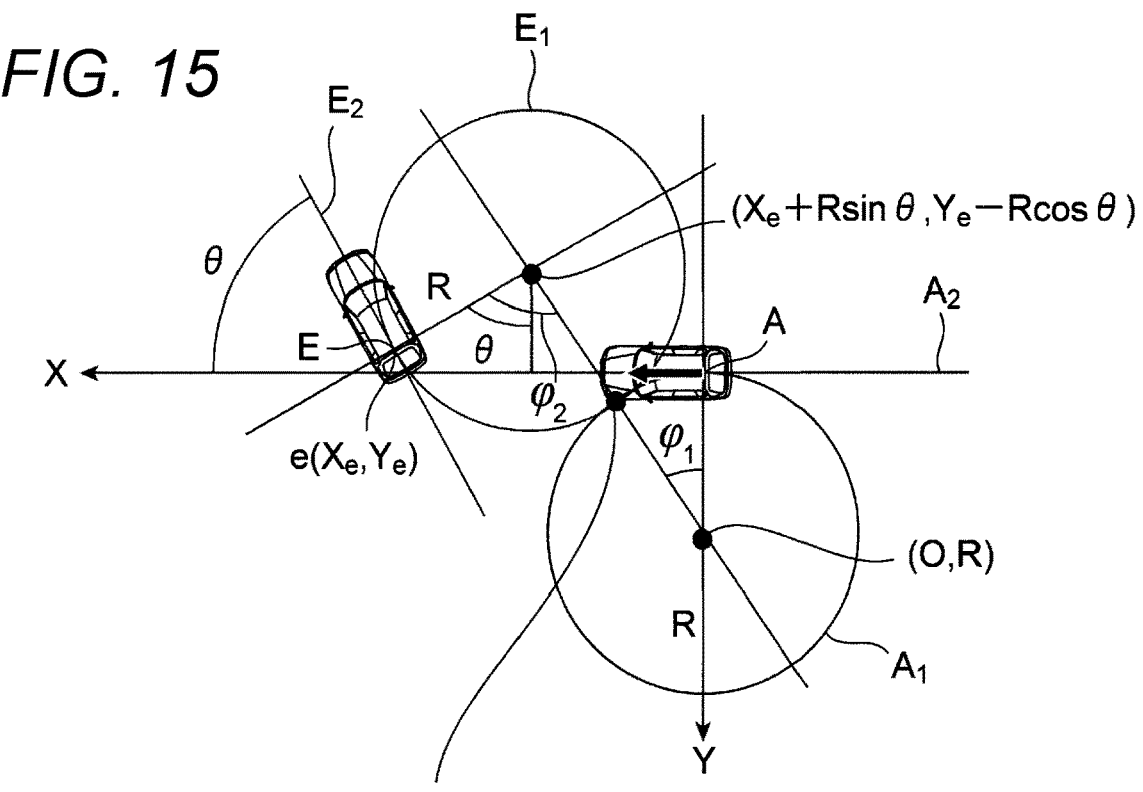
FIG. 15 is a view for explaining a generation method of a forward route by S-shaped steering.

FIG. 15 is a view for explaining a generation method of a forward route by S-shaped steering, and is a view for explaining a generation method in a case where the axis E2 intersects with the X axis, which is the axis A2 of the initial position A, on a rear side from the connectable position E.

Here, a radius R of the common turning circles E1 and A1 having the same radius for drawing the S-shape is calculated. Then, if a contact point of the circle is obtained, a forward route of S-shape can be generated by combining a circular arc of the turning circle A1 and a circular arc of the turning circle E1.

The radius of the common circle is obtained from a distance between center coordinates since the center coordinate of each circle is obtained.

[Mathematical Formula 9]

$$2R = \sqrt{(X_e + R\sin\theta)^2 + (Y_e - R\cos\theta - R)^2} \quad (9)$$

[Mathematical Formula 10]

$$R = \frac{-\{X_e\sin\theta - Y_e(1 + \cos\theta)\} - \sqrt{\{X_e\sin\theta - Y_e(1 + \cos\theta)\}^2 - 2(\cos\theta - 1)(X_e^2 + Y_e^2)}}{2(\cos\theta - 1)} \quad (10)$$

From the formula shown in FIG. 14(c), the respective turning angles φ1 and φ2 and the arc lengths b1 and b2 of the S-shape can be obtained by the following calculation formula.

[Mathematical Formula 11]

$$\varphi_1 = 2\sin^{-1}\left(\frac{\sqrt{X_m^2 + Y_m^2}}{2R}\right) \quad (11)$$

[Mathematical Formula 12]

$$b_1 = 2R\sin^{-1}\left(\frac{\sqrt{X_m^2 + Y_m^2}}{2R}\right) \quad (12)$$

[Mathematical Formula 13]

$$\varphi_2 = 2\sin^{-1}\left(\frac{\sqrt{(X_m - X_e)^2 + (Y_m - Y_e)^2}}{2R}\right) \quad (13)$$

[Mathematical Formula 14]

$$b_2 = 2R\sin^{-1}\left(\frac{\sqrt{(X_m - X_e)^2 + (Y_m - Y_e)^2}}{2R}\right) \quad (14)$$

Figure 16:
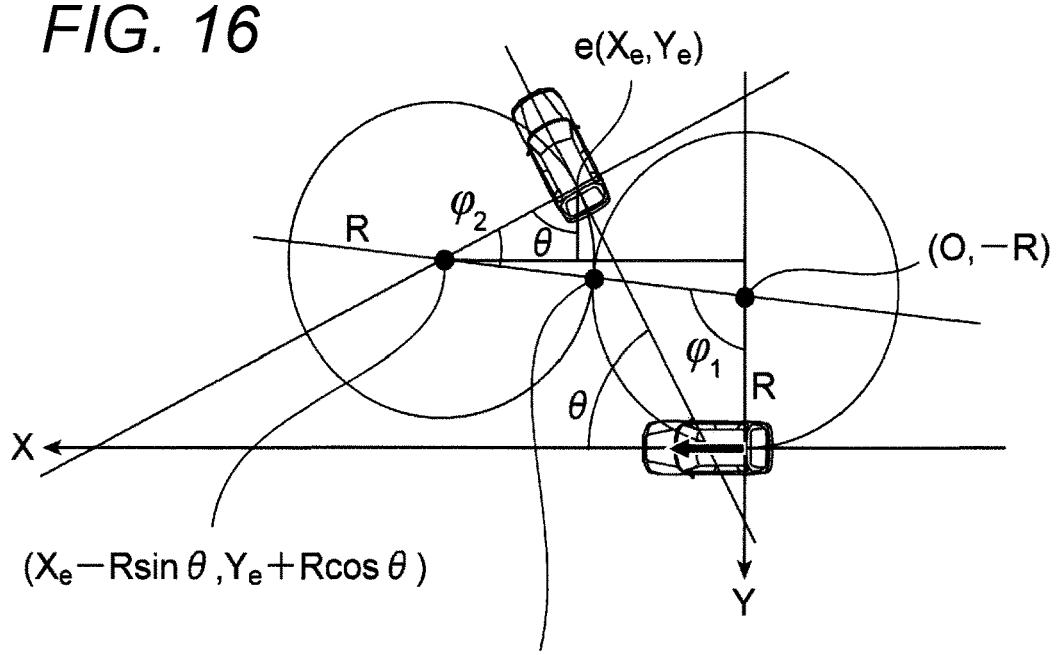
FIG. 16 is a view for explaining a generation method of a forward route by S-shaped steering.

FIG. 16 is a view for explaining a generation method of a forward route by S-shaped steering, and is a view for explaining a generation method in a case where the axis E2 intersects with the X axis, which is the axis A2 of the initial position A, on a rear side from the connectable position E.

Here, a radius R of the common circles E1 and A1 having the same radius for drawing the S-shape is calculated. Then, if a contact point of the circle is obtained, a forward route of S-shape can be generated by combining a circular arc of the turning circle A1 and a circular arc of the turning circle E1.

The radius of the common circle is obtained from a distance between center coordinates since the center coordinate of each circle is obtained.

[Mathematical Formula 15]

$$2R = \sqrt{(X_e + R\sin\theta)^2 + (Y_e + R\cos\theta + R)^2} \quad (15)$$

[Mathematical Formula 16]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (16)$$

From the formula shown in FIG. 14(c), the respective turning angles φ1 and φ2 and the arc lengths b1 and b2 of the S-shape can be obtained by the following calculation formula.

[Mathematical Formula 17]

$$\varphi_1 = 2\sin^{-1}\left(\frac{\sqrt{X_m^2 + Y_m^2}}{2R}\right) \quad (17)$$

[Mathematical Formula 18]

$$b_1 = 2R\sin^{-1}\left(\frac{\sqrt{X_m^2 + Y_m^2}}{2R}\right) \quad (18)$$

[Mathematical Formula 19]

$$\varphi_2 = 2\sin^{-1}\left(\frac{\sqrt{(X_m - X_e)^2 + (Y_m - Y_e)^2}}{2R}\right) \quad (19)$$

[Mathematical Formula 20]

$$b_2 = 2R\sin^{-1}\left(\frac{\sqrt{(X_m - X_e)^2 + (Y_m - Y_e)^2}}{2R}\right) \quad (20)$$

<Parking Route Setting Unit>

The parking route setting unit 13 sets a parking route by using information on the first route from the target parking position P1 to the virtual departure position P3 and information on the second route from the initial position P0 to the virtual departure position P3. The parking route is a combination of the second route from the initial position P0 to the virtual departure position P3 and a route of reverse running of the first route from the virtual departure position P3 to the target parking position P1.

According to the present invention, it is possible to calculate a parking route including turning back for guiding the own vehicle 21 to the target parking position P1 and park the vehicle in parallel in a correct vehicle orientation at a position intended by a driver, without depending on a start position where parking assistance is started and a vehicle orientation.

Although the embodiment of the present invention has been described in detail above, the present invention is not limited to the above embodiment, and various modifications of design may be made without departing from the spirit of the present invention described in claims. For example, the embodiment described above has been illustrated in detail to facilitate description for easy understanding of the present invention, and is not necessarily limited to the embodiment that includes all the configurations. Additionally, a part of a configuration of an embodiment may be replaced with a configuration of another embodiment, and a configuration of an embodiment may be added with a configuration of another embodiment. Moreover, a part of a configuration of each embodiment may be deleted, replaced, or added with another configuration.

REFERENCE SIGNS LIST 1 parking assist apparatus
11 first route calculation unit
12 second route calculation unit
13 parking route setting unit
15 operation input unit
16 route display unit
21 own vehicle
22 front obstacle
23 rear obstacle
24 side obstacle
121 forward/backward movement determination unit
122 backward movement starting route calculation unit
123 forward movement starting route calculation unit

The invention claimed is:

1. A parking assist apparatus for assisting parallel parking of an own vehicle, the parking assist apparatus comprising:
a first route calculation unit configured to calculate a first route for moving the own vehicle from a target parking position to a virtual departure position based on a parking space and a constraint condition of own vehicle behavior;
a second route calculation unit configured to calculate a second route for moving the own vehicle from an initial position where parking assistance is started to the virtual departure position; and
a parking route setting unit configured to set a parking route of the own vehicle with use of the first route and the second route,
wherein the second route calculation unit comprises:
a forward/backward movement determination unit configured to determine whether the initial position is on a front side or a rear side with respect to a first reference line extending along a longitudinal direction of the own vehicle at the virtual departure position;
a backward movement starting route calculation unit configured to calculate a backward movement starting route that connects from the initial position to the virtual departure position by a backward movement of the own vehicle as the second route when the initial position is on a front side from the first reference line; and
a forward movement starting route calculation unit configured to calculate a forward movement starting route that connects from the initial position to the virtual departure position by forward and backward movements of the own vehicle as the second route when the initial position is on a rear side from the first reference line or when it is impossible to calculate the backward movement starting route by the backward movement starting route calculation unit.

2. The parking assist apparatus according to claim 1, further comprising a connection candidate position setting unit configured to set a connection candidate position on a second reference line passing through the initial position and extending parallel to a parking direction,
wherein the forward movement starting route calculation unit calculates a forward movement route that connects from the initial position to the connection candidate position by a forward movement of the own vehicle, and a backward movement route that connects from the connection candidate position to the virtual departure position by a backward movement of the own vehicle, and the forward movement starting route calculation unit connects the forward movement route and the backward movement route to form the forward movement starting route.

3. The parking assist apparatus according to claim 2, wherein the connection candidate position setting unit calculates a position where a direction of the own vehicle becomes parallel to a parking direction by turning from the virtual departure position, and sets, as the connection candidate position, a position where the calculated position is moved in parallel along the first reference line and placed on the second reference line.

4. The parking assist apparatus according to claim 3, wherein the connection candidate position setting unit sets a plurality of other connection candidate positions with a predetermined interval on the second reference line from the connection candidate position.

* * * * *